(No Model.)
P. VAUGHAN.
BEER SCALE.
No. 290,153. Patented Dec. 11, 1883.
Fig. 1.
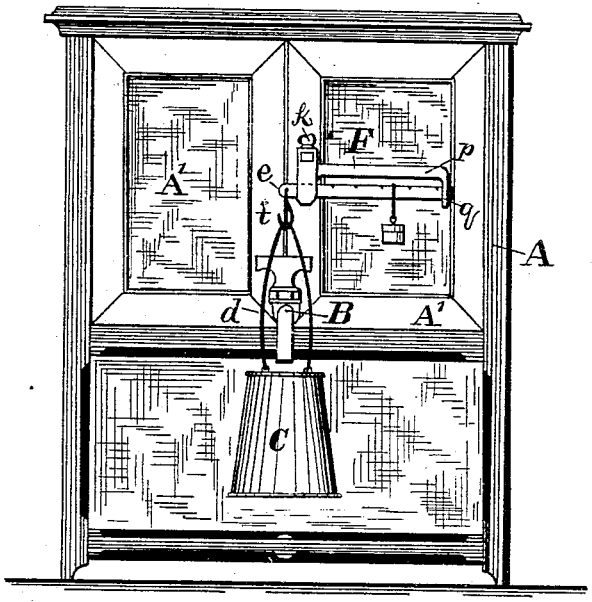
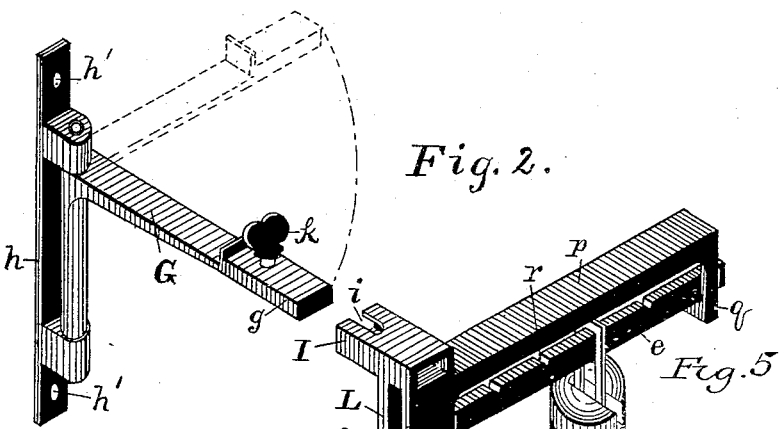
Fig. 2.
Fig. 4.
Fig. 5.
Fig. 3.
Witnesses:
John E. Morris
A. E. Eader
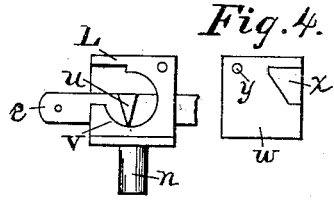
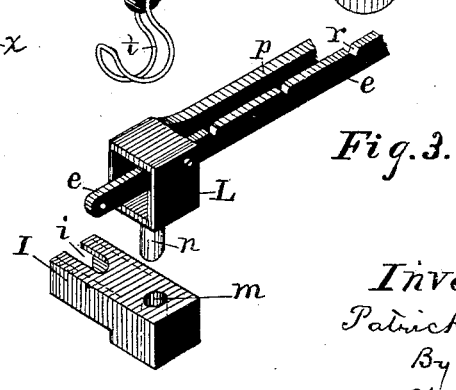
Inventor:
Patrick Vaughan
By his Atty
Chas B. Mann

UNITED STATES PATENT OFFICE.

PATRICK VAUGHAN, OF LOUISVILLE, KENTUCKY.

BEER-SCALE.

SPECIFICATION forming part of Letters Patent No. 290,152, dated December 11, 1883.

Application filed June 16, 1882. (No model.)

*To all whom it may concern:*

Be it known that I, PATRICK VAUGHAN, a citizen of the United States, residing at Louisville, in the county of Jefferson and State of Kentucky, have invented certain new and useful Improvements in Beer-Scales, of which the following is a specification, reference being had therein to the accompanying drawings.

My invention relates to a scale to be used in connection with a beer-keg or an ice-chest containing a beer-keg, so that the beer to be sold at retail may be weighed as drawn from the spigot.

The object of my invention is to provide a scale and attach it to the ice-chest or beer-keg in such manner that a vessel suspended from the scale may hang directly below the spigot, so that when beer to the proper weight shall have been drawn into the vessel the spigot may be instantly turned to stop the flow.

In the drawings hereto annexed, Figure 1 is a front view of a refrigerator for beer with my improvement attached. Fig. 2 is a view of the hanger-arm. Fig. 3 is a view of the scale, the scale-beam and stay-arm being adapted to swing independently of the hanger-arm. Fig. 4 is a side view of a part of the scale and the plate which covers the beam-bearings. Fig. 5 shows a modification of the scale-beam and stay-arm.

The letter A designates an ice-chest containing a keg of beer, (not shown;) B, the spigot attached to the keg, and projecting through the chest, and from which the beer is drawn, and C a vessel hung directly below the spigot to receive the beer. The vessel has a bail, $d$, and is thereby suspended from the beam $e$ of the scale F. In order to adapt the scale for this particular purpose and render its use convenient, a hanger-arm, G, of certain construction, is provided for supporting the scale, which will permit of readily moving the scale from its position whenever it is desired to take out or put in a keg, and this arrangement of having the scale so as to permit of conveniently moving it is of importance, whether an ice-chest be used or not. The hanger-arm G is hinged or pivoted to a plate, $h$, of any suitable shape, adapted for attachment by means of screws through the holes $h'$ to the beer-keg or ice-chest containing the keg. This allows the hanger-arm to swing laterally, as indicated in Fig. 2. The scale proper is attached to the hanger-arm by means of a socket, I, into which the end $g$ of the hanger enters. At one side of the entrance of the socket is a slot, $i$, and on the corresponding part of the end $g$ of the hanger is a tightening set-screw, $k$. As the end of the hanger-arm enters the socket, the shank of the set-screw occupies the slot $i$, and a single turn on the set-screw is sufficient to cause its head to bind on the socket each side of the slot. By this construction it is unnecessary at any time to wholly remove the tightening-screw. By giving it a single turn, the slotted socket may be withdrawn. The socket and scale proper, F, as shown in Fig. 3, are connected by a swivel or pivot, $n$, whereby the scale may swing laterally and independent of the hanger-arm. The socket is provided with a hole, $m$, passing through in the vertical direction, and the balancing-head L has a spindle, $n$, projecting downward from its bottom, which enters the hole in the socket. This constitutes the swivel or pivot. It is obvious that the swivel or pivot will permit the scale-beam and stay-arm to swing laterally and independent of the hanger-arm, whether the socket be used or not. Said pivot $n$, therefore, may enter a hole in the socket or in the arm, if the socket be not used. An arm, $p$, is rigidly attached to and extends horizontally from the balancing-head, and at its end has a stay or support, $q$, for the beam $e$. The beam has several deep-cut notches, $r$, so made for the express purpose that they may be readily felt by the hand, which thereby enables a person to readily adjust the weight $s$ on the beam by the sense of touch at times when there is insufficient light to see the notches. In the drawings two weights are shown. Both are used only when selling the cheaper kinds of beer. For the best lager only one weight is used. At the pivoted end the beam has a hook, $t$, by which the vessel is suspended.

In Fig. 4 the construction of the balancing-head L is shown. The beam has knife-edge bearings $u$, which rest on the circular bearings $v$, and the side of the said head is closed, so as to cover these bearings by a plate, $w$, an inner side view of which is shown. The projection

*x* on the inner side of the plate occupies the opening in the upper left-hand corner of the circular bearing in the head, and a screw may be entered through the hole *y* in the plate, into the hole in the side of the head and thus retain the plate.

In many cases ice-chests to contain beer-kegs have doors A', which are not hinged, but are lifted from their position, and in such cases, if the hanger-arm is attached to the door, it is desirable to be able to readily detach the scale from the hanger before disturbing the door. The fact that the scale proper and the vessel suspended from it may be moved either by swinging the hanger-arm itself and the scale, or by swinging the scale-beam independently of the hanger-arm, enables the scale to be attached to some convenient side support, and at the same time provides for swinging the suspended vessel so as to bring it directly below the spigot, and when the desired quantity of the beer has been drawn to swing it away from the spigot. It thus greatly facilitates the work of drawing and weighing the beer. The first notch on the scale-beam is adapted for weighing the smallest quantity sold—say five cents' worth—the second notch, say, for ten cents' worth, and so on.

I am aware of the scale shown and described in Letters Patent No. 165,114, dated June 29, 1875, and I do not here claim such construction.

Having described my invention, I claim and desire to secure by Letters Patent of the United States—

1. A scale having a balancing-head, L, provided with a spindle, *n*, projecting downward from its bottom, by which it is swiveled to turn in a horizontal plane, and also provided with a horizontal stay-arm, *p*, and the scale-beam *e*, pivoted in the balancing-head above the spindle, as shown and described.

2. The scale herein described, consisting of the pivoted hanger-arm, adapted to move laterally, and the scale-beam-balancing head L, having at its bottom a downward-projecting spindle, *n*, by which it is swiveled to the end of the hanger-arm, and said head also having the rigidly-secured horizontal stay-arm *p*, whereby the hanger-arm, scale-beam, and stay-arm may all swing laterally, or the scale-beam and stay-arm may swing laterally and independently of the hanger-arm, as set forth.

3. In a scale, the combination of a hanger-arm having a tightening-screw, *k*, a scale-beam, and a head in which the beam is balanced, provided with a socket having a slot, *i*, at one side of its entrance, as set forth.

In testimony whereof I affix my signature in presence of two witnesses.

PATRICK VAUGHAN.

Witnesses:
M. H. SCOTT,
W. W. MELONE.